March 30, 1954

J. C. BRUMFIELD 2,673,908

INSTANTANEOUS TRIP CIRCUIT BREAKER

Filed Dec. 29, 1951

INVENTOR.
JOHN C. BRUMFIELD

BY
Ostrolenk & Faber
ATTORNEYS

March 30, 1954     J. C. BRUMFIELD     2,673,908
INSTANTANEOUS TRIP CIRCUIT BREAKER
Filed Dec. 29, 1951     3 Sheets-Sheet 2
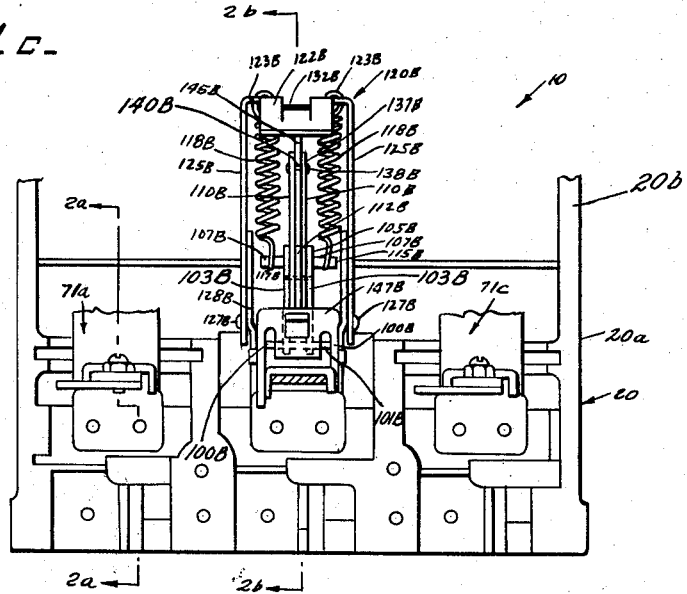
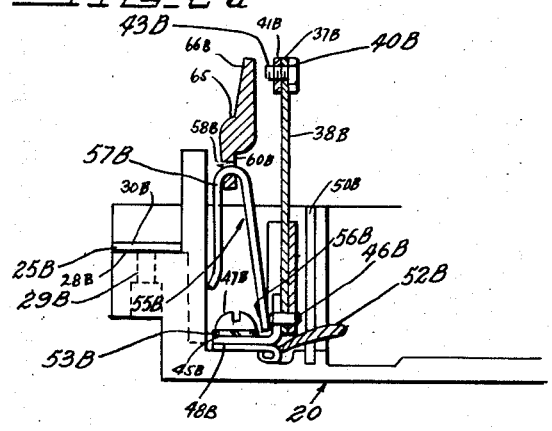
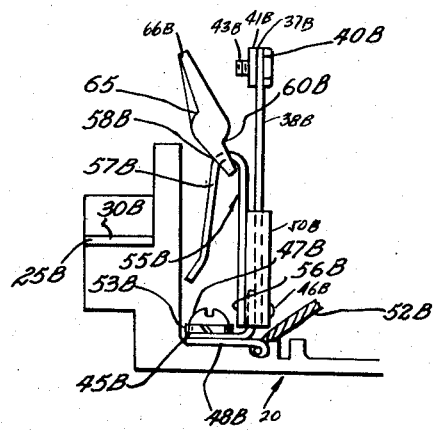
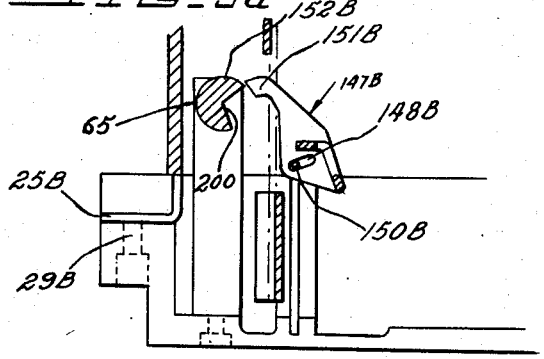
INVENTOR.
JOHN C. BRUMFIELD
BY
Ostrolenk & Faber
ATTORNEYS March 30, 1954     J. C. BRUMFIELD     2,673,908
INSTANTANEOUS TRIP CIRCUIT BREAKER
Filed Dec. 29, 1951     3 Sheets-Sheet 3

INVENTOR.
JOHN C. BRUMFIELD

BY
Ostrolenk & Faber
ATTORNEYS

Patented Mar. 30, 1954

2,673,908

UNITED STATES PATENT OFFICE 2,673,908

INSTANTANEOUS TRIP CIRCUIT BREAKER

John C. Brumfield, Philadelphia, Pa., assignor to I-T-E Circuit Breaker Company, Philadelphia, Pa., a corporation of Pennsylvania Application December 29, 1951, Serial No. 264,097

8 Claims. (Cl. 200—88)

My present invention relates to circuit breakers and more particularly it relates to a simplified form of tripping mechanism for tripping circuit breakers open under fault current conditions.

As is well-known in the art, circuit breakers designed for feeder and branch circuit protection are usually provided with thermally operated devices for use in load centers, lighting and distribution panel boards, convertible power panels on switch boards or in individual enclosures.

These types of circuit breakers are used for overload protection of insulator conductors. This protection is usually required in a system at points where wire size is reduced.

In better type circuit breakers a magnetic tripping device is added to the thermally responsive member so that the thermally responsive member is operative to open the circuit breaker for values of fault currents below a certain maximum value, while the magnetic means becomes operative for any value of fault current above that maximum value.

In this way the magnetic member will protect the thermally responsive member from very large currents that might permanently injure the metal of which the thermally responsive member is made.

Since these circuit breakers have to perform so many functions, they must be small in size and extremely compact, and all their component parts must occupy the smallest possible amount of space.

Furthermore, the magnetic tripping device must be regulated so that it will really protect the thermally responsive member from damage. In other words, the movable member of the magnetic tripping device must be of such construction that when a large fault current flows in the circuit breaker the movable element will immediately respond to that current and trip the circuit breaker open.

When the circuit breakers are multi-pole circuit breakers, a further problem is added in that in order to protect the circuits from single phasing, that is, in order to avoid having two circuits closed while the other one has been opened because of a fault current in its line, it is necessary to have a mechanism that will open all poles of the circuit breaker when a fault occurs in one of the circuits protected by the multi-pole circuit breaker.

My novel invention overcomes these difficulties. It consists essentially of a circuit breaker having a tripper bar operable by the armature of the magnetic tripping device, the tripper bar being also operable by the thermally responsive means.

The movable armature is so constructed that easy regulation is achieved for tripping the circuit breaker with a magnetic tripping device when the fault current's magnitude is above a certain minimum value.

In the two and three pole embodiment of my present invention, the tripper bar is common to all three poles of the circuit breaker and every pole of the circuit breaker is further provided with individual and independently operated thermally responsive means in any one of the lines protected by the circuit breaker and therefore will produce instantaneous and immediate opening of all three poles of the circuit breaker, thus avoiding single phasing.

More specifically, the tripper bar in my invention is provided with three extensions, if the circuit breaker under consideration is a three-pole circuit breaker, perpendicular to the axis of the tripper bar itself.

Each of these extensions is provided at one end with a hole engageable by the hook-shaped end of the armature of a magnet, the other side of the armature being secured to the same support on which the magnet is mounted.

In the example of the three-pole circuit breaker, the tripper bar is also so shaped at the center or main pole that when the tripper bar is rotated it permits the latch to release the cradle of the circuit breaker, thus opening the circuit breaker.

As previously mentioned, the tripper bar has three extensions for a three-pole circuit breaker. Each of these extensions is provided at one end with a hole to be engaged by the hook-shaped end of the armature of the fault current responsive magnet.

The other end of these extensions of the tripper bar is so prolonged that it may be hit by the free end of the thermally responsive means on which is mounted the magnet and which is supported by the same member that supports the armature of the magnet.

If the fault current flowing through the circuit breaker is below a certain magnitude, the thermally responsive means will become operative, will bend and will cause the tripper bar to rotate in one direction to unlatch the cradle and to open the circuit breaker.

When, on the other hand, the fault current flowing through the circuit breaker is greater than the above-mentioned value, the magnet becomes operative before the thermally responsive means can be damaged and it attracts to itself the armature which being hooked to the tripper bar causes the tripper bar to rotate in the same direction as previously mentioned to unlatch the cradle and, therefore, open the circuit breaker.

If it is desired to change the value of the current at which the magnet becomes operative, it is only necessary to move its armature nearer to the magnet or at least to move its armature in such a position with respect to the magnet that a smaller amount of magnetic pull is required to operate the tripper bar connected to the armature.

The main object of my present invention is the provision of means whereby the fault current responsive means are simplified and made more economical to produce.

Another object of my present invention is the provision of a hook-shaped armature continuously engaging a tripper bar.

A further object of my present invention is the provision of a tripper bar so shaped that it can be operated both by thermally responsive means and magnetic means to trip the circuit breaker open.

Another object of my present invention is the provision of means whereby the value of current at which the magnetic fault current responsive means become operative is easily changed.

A further object of my present invention is a novel latch surface, an integral part of a tripper bar.

The foregoing and many other objects of my invention will become apparent in the following description and drawings in which:

Figure 1c is another sectional view of the circuit breaker of Figure 1a taken on line c—c of Figure 1a and looking in the direction of the arrows.

Figure 2a is a detail drawing of my novel armature and tripper bar showing the armature before its operation under fault currents.

Figure 2b is a detail drawing of my novel armature and tripper bar showing the armature at the instant of operation under fault currents.

Figure 3a is a detail drawing of my novel latching means.

Figure 3b is a detail drawing of my novel latching surface.

Figure 3c is the front view of the latching surface of Figure 3b.

Figure 1A:
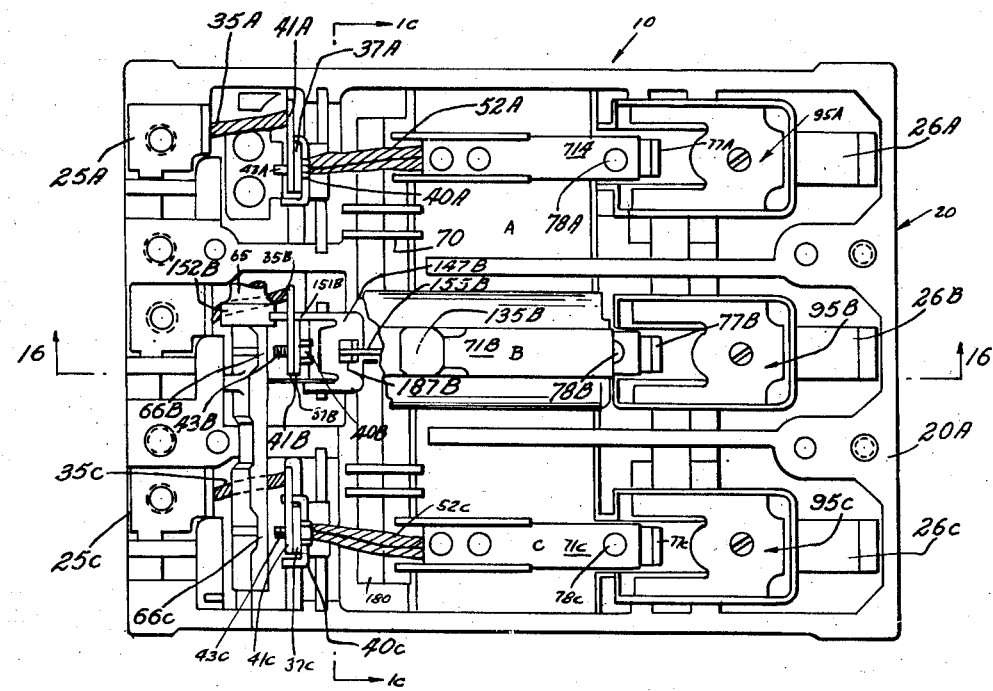
Figure 1a is a top view with the cover removed of a circuit breaker incorporating my present invention.
Figure 1B:
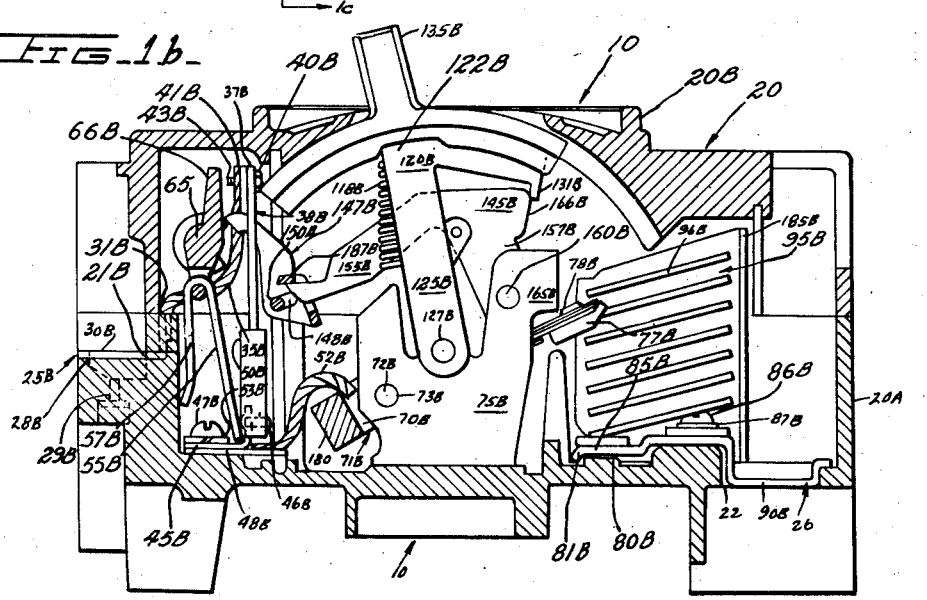
Figure 1b is a sectional view of the circuit breaker of Figure 1a taken on line b—b of Figure 1a looking in the direction of the arrows.

Referring first to Figures 1a, 1b, and 1c showing the three-pole embodiment of my present invention, the housing 20 of circuit breaker 10, preferably made of a plastic substance, is provided with appropriate openings 21 and 22 through which the circuit breaker terminals 25 and 26, respectively, are substantially brought out of housing 20 to be engaged by the line terminals (not shown) of the line to be protected.

Housing 20 consists of two sections, a base 20a which is the section of housing 20 on which the different elements of circiut breaker 10 are mounted as hereinafter described and a cover 20b which completely closes circuit breaker 10 by engaging tightly base 20a.

Since a three-pole circuit breaker 10 is being considered in this example, it is quite evident that there will be three sets of circuit breaker terminals 25 and 26, but to make this description clearer the center phase B of the three-pole circuit breaker 10 having phases A, B and C will be described first.

Considering then this center phase B of the three-pole circuit breaker 10, the circuit breaker terminal 25B rests against an extending shoulder 28B of molding 20a. Shoulder 28B is centrally perforated at 29B to house eventually a bolt and a nut (not shown) to secure the line terminal (not shown) to circuit breaker terminal 25B. As previously mentioned, circuit breaker terminal 25B extends through opening 21B into base 20a. Circuit breaker terminal 25B is shaped like an angle, one side 30B of the angle being used to receive a line terminal (not shown), while the other side 31B is soldered or in any other way connected to a pigtail or conductor 35B.

Pigtail 35B is rigidly secured to the free end 37B of thermally responsive member 38B (Figure 2a). Free end 37B is provided with a bolt 40B and a nut 41B. Extension 43B of bolt 40B serves a purpose hereinafter set forth.

Thermally responsive means 38B is secured at its other end to a metallic angle 45B through a rivet 46B or any other suitable means. Angle 45B is secured to housing 20 through a screw 47B. A metallic member 48B is interposed between the angle 45B and the surface of the housing 20. Metallic member 48B is connected to a second pigtail or conductor 52B. Washer 53B is interposed between the head of screw 47B and the angle 45B.

Rivet 46B which serves to secure thermally responsive means 38B to angle 45B also serves to secure substantially rectangularly shaped magnet 50B to thermally responsive means 38B.

The armature 55B for magnet 50B is hook-shaped and is loosely pivoted at its end 56B between the head of screw 47B and the head of the rivet 46B. The hook 55B of armature 55B engages a hole 58B in one extension 60B of tripper bar 65.

Tripper bar 65 is provided at this phase B and in all other phases A and C with two members 60 and 66 extending in opposite directions with respect to each other and in a plane perpendicular to the axis of rotation of tripper bar 65.

Considering the center phase B, although this will be true also for phases A and C, member 66B extends opposite to extension 43B of screw 40B.

In Figures 1b and 1c the circuit breaker 10 is shown in the open position but not after being tripped by fault currents. The tripping mechanism will retain all the relative positions shown in the above-mentioned figure also when the circuit breaker 10 is closed, the relative position changing only if fault currents flow through any phase of the circuit breaker 10.

In the above-mentioned figure, extensions 60B and 66B of tripper bar 65 are essentially parallel to the thermally responsive means 38B while armature 55B of the magnetic responsive means 50B is at an angle (acute) with respect to the same thermally responsive means 38B and, therefore, of magnet 50B.

When under fault current conditions the thermally responsive means 38B becomes operative, it will bend and will impart to extension 66B of tripper bar 65 an impact through extension 43B of screw 40B.

If, on the other hand, magnet 50B becomes operative, it will pull toward itself armature 55B which being hooked into extension 60B of tripper bar 65 will impart to tripper bar 65 a rotation which as shown in this drawing will be counter-clockwise (see Figures 2a and 2b.)

It is easily seen, of course, that when extension 43B of screw 40B hits extension 66B of tripper bar 65 it will impart to tripper bar 65 a motion which as shown in the figure will be counterclockwise.

In other words, both thermally responsive means 38B and magnet 50B when operative will impart to tripper bar 65 a motion that is counterclockwise.

The value of fault current at which thermally responsive means 38B hits tripper bar 65 is regulated by means of screw 40B. In fact, if screw extension 43B is near extension 66B of tripper bar 65, the value of fault current at which the thermally responsive means 38B becomes operative will be relatively small, the opposite being true if screw extension 43B is moved away from extension 66B.

The value of current at which magnet 50B becomes operative and pulls armature 55B completely toward magnet 50B can also be regulated by increasing or decreasing the angle formed by armature 55B with respect to magnet 50B. It is evident, of course, that when the angle is increased or the armature 55B is moved away from magnet 50B the value of current at which armature 55B is pulled to magnet 50B is greater than when the angle is decreased or the armature 55B is moved nearer to magnet 50B.

Referring to Figures 1a, 1b and 1c, pigtail 52B from fault current responsive means 38B and 50B is electrically connected in any suitable way to one end 70B of movable contact arm 71B. Movable contact arm 71B is pivoted by means of pivot pin 72B engaging aligned openings 73B of the metallic frame or support 75B.

Contact arm 71B is provided at its other end with a substantially rectangular shaped contact slab 77B. Contact slab 77B made of good conducting material is rigidly secured to contact arm 71B by means of a rivet 78B or in any other suitable way.

Stationary contact 80B consists of a rectangular section metallic member 81B having at the end nearer to contact arm 71B a stationary contact slab 85B rigidly secured to member 81B. Member 81B is secured to housing 20 of the circuit breaker through a screw 86B and a washer 87B.

Stationary contact 80B is also provided with a terminal extension 26, an integral part of metallic member 81B which extends for a portion 90B out of housing 20 to permit by means of screw means (not shown) the connection of a line terminal to circuit breaker terminal 26.

Stationary contact 80B is also provided with an arc extinguishing chamber 95B or arc chute having a number of arc extinguishing plates 96B so that at the opening portion of the circuit breaker the arc existing between contact slab 77B and contact slab 85B is extinguished before producing damage to the contact slabs 77B and 85B.

Contact arm 71B is provided near its center with another set of aligned openings 100B which are engaged by a pin 101B carrying two metallic fingers 103B which are one member of circuit breaker toggle mechanism 105 B. The two finger members 103B which are secured to contact arm 71B by means of pin 101B are, therefore, rotatable with respect to contact arm 71B and an upward or downward motion of fingers 103B will be accompanied by a rotation of contact arm 71B around its pivot 72B. The two fingers 103B are rigidly secured by means of a rivet 106B located approximately centrally in fingers 103B.

At the other end of fingers 103B, fingers 103B are provided with aligned openings 107B which are engaged by another pin 108B. Between the two fingers 103B are located the other two members 110B of toggle mechanism 105B. These two members 110B are provided with aligned openings to be engaged by pin 108B interiorly with respect to fingers 103B. Between the two members 110B is located a disc 112B for permitting easy rotation or movement of members 110B with respect to members 103B and vice versa.

Pin 108B is provided at its two ends 115B with recesses 117B on each of which is secured a spring 118B. Springs 118B are secured at the other end to a T-shaped member 120B, in its upper portion 122B, where springs 118B engage appropriate openings 123B in that upper portion 122B of T-shaped member 120B. T-shaped member 120B has two legs 125B, one on each side of toggle 105B. Legs 125B are provided with rivets 127B which engage U-shaped recesses 128B, one on each side of frame 75B. Rivets 127B are so shaped that they permit free rotation of T-shaped member 120B with respect to frame 75B.

T-shaped member 120B is provided at its upper portion 122B with an extension 131B substantially rectangular whose use will be described hereinafter. Upper portion 122B of T-shaped member 120B is slotted in its mid portion and provided with raised members 132B cut out from the upper portion 122B of T-shaped member 120B which serves to be engaged by a plastic operating handle 135B for manually opening and closing the circuit breaker as hereinafter described.

The upper portion of arms 110B is also provided with aligned openings 137B engaged by rivet 138B which secures the two arms 110B together and engages an opening 140B aligned with openings 137B.

Opening 140B is in an essentially V-shaped member or cradle 145B. One leg 155B of V-shaped cradle 145B is shaped as shown in Figure 1b to engage a latch 147B. Latch 147B (Figure 3a) is provided with a slot 148B engaged by pin 150B around which latch 147B can rotate and can also have translational motion.

Latch 147B is provided with a pointed end 151B latched under normal conditions by a latch surface 152B on tripper bar 65. Latch surface 152B (see Figure 3b) is composed of a thin strip of spring material formed with the grain in essentially C shape so that it can be snapped or sprung about the member, in this case tripper bar 65, supporting the latch 157B. The other leg 147B of V-shaped member 145B is provided with a cylindrical hole (not shown) engaged by a pivot pin 160B secured to the raised portion 165B of frame 75B. Leg 157B of V-shaped member 145B is provided at the bottom of the V with a shoulder extension 168B. Raised portion 165B of frame 75B is provided with an opening (not shown) through which passes contact slab 77B of movable contact arm 71B and provides a stop for V-shaped cradle 145B.

Near the end 70B of movable contact arm 71B at which pigtail 52B is connected, an essentially rectangular section bar 180 is rigidly secured to movable contact arm 71B in any suitable way. Shaft or tie bar 180 is common to all three phases A, B and C of the three-pole circuit breaker, being rigidly secured to the ends 70 of the movable contact arm 71 of every phase so that if one movable contact, for example, 71B is moved either open or closed, the other two movable contact arms 71A and 71C will simultaneously perform the same movements.

The circuit breaker 10 is also provided around arc chute 95B with an insulation 185B for completely insulating arc chute 95B.

Figure 4:
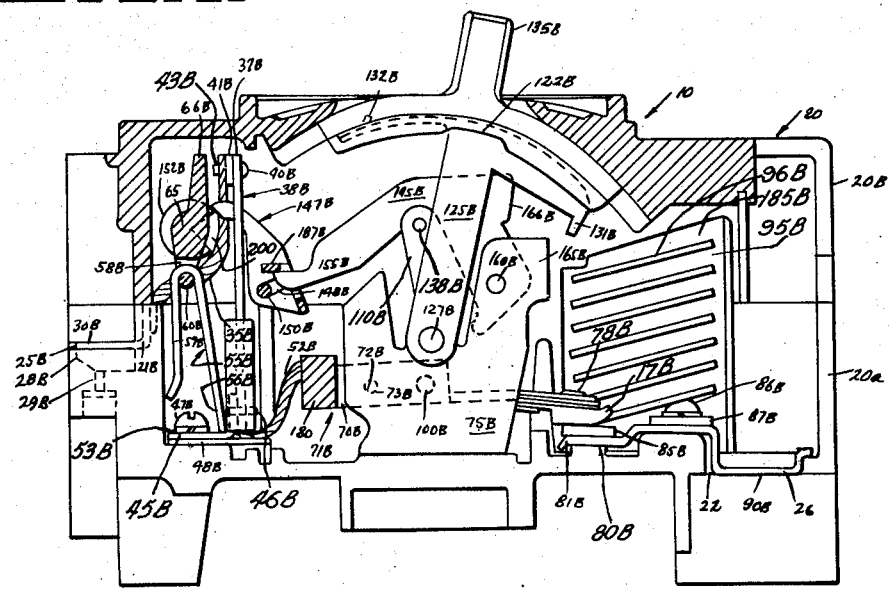
Figure 4 is another sectional view of the circuit breaker incorporating my invention showing the circuit breaker in the closed position.

Referring now to Figures 1b and 4 showing, respectively, the circuit breaker in the open position and the circuit breaker in the closed position, when the circuit breaker is in the open position but ready to be closed or, in other words, not open because of fault currents, latch surface 152B of tripper bar 65 engages the pointed end 151B of latch 147B so that extension 155B of V-shaped cradle 145B is latched at protrusion 187B of latch member 147B.

Cradle 145B will then be as shown in the two figures and, therefore, remains in that position also when the circuit breaker 10 is manually closed by moving handle 135B from left to right as shown in Figures 1b and 4.

When handle 135B is moved from left to right, it moves with it T-shaped member 120B which will rotate around pivot 127B and at an initial time will tension springs 118B of toggle 105B. When spring 118B now under tension is moved through T-shaped member 120B over center with respect to toggle 105B, a force is produced by springs 118B which makes toggle as shown in Figure 4 from its collapsed position shown in Figure 1b.

When springs 118B go over center under the continuous motion from left to right of T-shaped member 120B, they also bias T-shaped member 120B in a counterclockwise direction of rotation so that T-shaped member 120B will now move clockwise.

In order to stop the clockwise motion of T-shaped member 120B, raised extension 165B of frame 75B is so shaped that legs 125B will hit the two sides of raised extension 165B of frame 75B after T-shaped section 120B is rotated through the correct number of degrees.

As toggle 105 is being made during the motion of T-shaped member 120B from left to right, arms 103B of toggle 105B push movable contact arm 71B and cause it to rotate around its pivot 72B also in a clockwise motion.

When toggle 105B is finally made, contact slab 77B is now under high pressure engagement with stationary contact slab 85B so that an electrical circuit is now closed between terminal 25B and terminal 26 of circuit breaker 10.

When it is desired to open the circuit breaker 10, handle 135B is moved from right to left as shown in Figures 4 and 1b.

After springs 118B have moved over center through motion of T-shaped member 120B rigidly movable with handle 135B, toggle 105B collapses and causes movable contact 71B to rotate around its pivot 72B, thus opening the electrical contact between movable contact slab 77B and stationary contact slab 85B of stationary assembly 80B.

As previously mentioned, during the opening operation an arc will occur between movable slab 77B and stationary slab 85B, but circuit breaker 10 is provided with arc chute 95B which essentially extinguishes the arc between slab 77B and slab 85B during the opening operation of circuit breaker 10.

Rotation of movable contact member 71B around its pivot 72B is accompanied by similar rotations of the other two movable contact members 71A and 71C of the other two phases A and C, respectively, since the three phases are tied together through tie bar 180 connected at one extremity 70 of movable contact arms 71.

During both the opening and closing operations of the circuit breaker 10, cradle 145B does not move. In other words, its extension 155B remains in engagement with latch 147B which engages latch surface 152B, an integral part of tripper bar 65.

Considering now circuit breaker 10 in its closed position and assuming that a fault current occurs in phase B if the fault current is below a certain maximum value, thermally responsive means 38B will bend toward extension 66B of tripper bar 65 and the extension 43B bearing against extension 66B of tripper bar 65 will cause tripper bar 65 to rotate counterclockwise for the drawing shown in Figure 2a.

Counterclockwise rotation of tripper bar 65 causes a similar rotation of the latching surface member 152B mounted on tripper bar 65 in the same direction.

Since latching surface member 152B is shaped essentially circularly with approximately a 90° circular section removed from the circle, counterclockwise rotation of latching surface 152B causes extension 151B of latch 147B to fall into a 90° recess 200. As extension 151B of latch 147B falls into recess 200 of latching surface 152B, latch 147B rotates and moves with respect to its pivot 150B, thus freeing leg 155B of cradle 145B from engagement with protrusion 187B of latch 147. Cradle 145B is thus made free to rotate in a clockwise direction as shown in Figure 5.

As cradle 145B rotates, it moves toggle 105B and with it springs 118B over center so that springs 118B now break toggle 105B and as previously described open the circuit breaker electrical contact between contact slab 77B and contact slab 85B. Because of the biasing actions of springs 118B, extension 157B of cradle 145B will hit raised extension 165B of support 75B and will be stopped by raised extension 165B.

Figure 5:
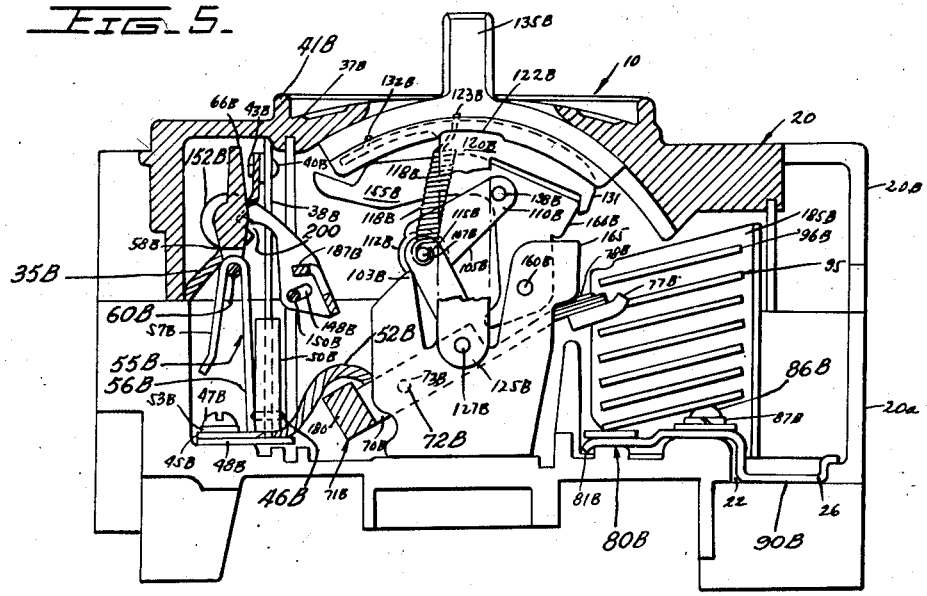
Figure 5 is another sectional view of the circuit breaker incorporating my invention showing the circuit breaker in the tripped open position.

Also, because of the biasing action of springs 118B, T-shaped member 120B and with it handle 135B will rotate during this opening operation of circuit breaker 10 from the position shown in Figure 4 to the position shown in Figure 5, the handle being, therefore, now essentially in a mid position between that shown in Figure 1b and in Figure 4, allowing the operator to see which electrical circuit has had a fault.

Of course, as previously mentioned, if the fault occurs in phase B also the other phases A and C will open since the movable contact arms 71 of the three phases A, B and C are tied together by means of tie bar 180 secured to the ends 70 of movable contact arms 71.

If the fault in the line protected by circuit breaker 10 has been repaired or it is cleared, the operator can close circuit breaker 10 from its tripped position as shown in Figure 5. In order to close circuit breaker 10, the operator will first move handle 135B leftwardly as shown in Figure 5 carrying with it cradle 145B since now shoulder extension 166B of cradle 145B bears against extension 131B of T-shaped member 120B, and member 120B rotates with handle 135B.

When handle 135B is brought all the way to the left (Figure 1b), then extension 155B of cradle 145B engages against protrusion 181B of latch 147B since latch 147B is now returned to the position shown in Figure 1b. This is made possible by clockwise rotation of tripper bar 65 caused by the biasing action of torsion spring 201 against tripper bar 65 which tries to move tripper bar 65 in a clockwise direction. Of course, this rotation of tripper bar 65 is also made possible by the fact that bimetal 38B is now returned to its original position. In other words, extension 43B does not bear any more against extension 66B of tripper bar 65.

After engagement of cradle 145B with latch 147B, the operator moves handle 135B from left to right, thus closing all three phases A, B and C of circuit breaker 10 as previously explained.

If the fault should occur in any of the other two phases A and C and its fault current should be less than a certain maximum, their thermally responsive members 38A and 38C, respectively, will come into operation, will cause tripper bar 65 to rotate in a counterclockwise direction to release cradle 145B and perform the above-described operation, thus opening all three phases A, B and C of circuit breaker 10.

If the fault current is greater than the above-mentioned maximum value, the corresponding magnet 50 comes into operation before thermally responsive means 38 and attracts armature 55 toward itself, thus also causing tripper bar 65 to rotate in a counterclockwise direction and to repeat the above-described operations with the resultant opening of phases A, B and C of circuit breaker 10.

Of course, after this opening operation, armature 55 is not any more attracted to magnet 50 and will, therefore, return to its original position in which its extension 56 bears against molding 20 of circuit breaker 10, thus allowing spring 201 to impart a clockwise rotation of tripper bar 65 making now possible the reclosing operation of circuit breaker 10.

It is quite evident that a two-pole circuit breaker using the same fault current responsive means can be constructed in a manner similar to the one described in connection with the three-pole circuit breaker with, of course, one of the phases A or C missing.

The two-pole circuit breaker may consist of phase A and phase B or phase B and phase C as described in connection with a three-pole circuit breaker. In that case also tie bar 180 connecting movable contact arms 71 will extend only between the two phases of the two-pole circuit breaker, thus tying the two movable contact arms 71 of the two-pole circuit breaker together.

If a single pole circuit breaker is to be constructed using the above-described invention, it is only necessary to remove phases A and C of the three-pole circuit breaker 10. It is, of course, evident that in the single pole case no tie bar 180 will be necessary, and the tripper bar 65 will be provided with only one set of extensions 60B and 66B and one latching surface 152B.

The operation of both the two-pole circuit breaker and the single pole circuit breaker will essentially be the same as the one described above in connection with the three-pole circuit breaker, the only difference being that in the two-pole circuit breaker, for example, only the center phase B of the three-pole circuit breaker and one of the side phases is used while in the single pole circuit breaker only the center phase itself is used.

It is also seen that the molding of the two-pole and single pole circuit breaker will be different from a three-pole circuit breaker casing, but since the variations noted are quite evident, these modifications will not be described here.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. In a circuit breaker for instantaneous trip opening under fault current conditions, a movable contact arm, a movable contact, a complementary contact, said movable contact mounted on said movable contact arm, said movable contact engaging said complementary contact at the circuit breaker closed position, said contacts being disengaged at the circuit breaker open position, toggle means connected to said movable contact arm, said toggle being collapsed in one direction at the circuit breaker closed position and in the opposite direction in the circuit breaker open position, a V-shaped cradle mounted for rotation around one of its ends, said toggle means being mounted at its other side on the apex of said V-shaped cradle, a T-shaped member and a handle movable around the end of the central leg of the said T-shaped member, spring means mounted between said movable contact and said T-shaped member for biasing said toggle in the collapsed positions, latching means comprising a latch pivoted at its center and a substantially circular latching surface, a tripper bar rotatable around its axis, said latching surface being mounted on said tripper bar, said tripper bar also having radial extensions, thermally responsive and magnetic means for operating said latching means to unlatch said cradle at fault currents, said magnetic means comprising a magnet and a movable armature, said magnet being mounted on said thermally responsive means, said armature comprising a hook-shaped member pivoted at one end and engaging one of said tripper bar extensions.

2. In a circuit breaker for instantaneous trip opening under fault current conditions, a movable contact arm, a movable contact, a complementary contact; said movable contact arm carrying said movable contact, said movable contact engaging said complementary contact at the circuit breaker closed position, said contacts being disengaged at the circuit breaker open position, fault current responsive means for opening said circuit breaker under fault current conditions, said fault current responsive means comprising thermal and magnetic means; said magnetic means comprising a hook-shaped armature and a magnet, said magnet being secured to said thermally responsive means, said armature being pivotally movable when attracted by said magnet under fault current conditions; said hook-shaped armature and said thermal means moved in opposite directions to effect opening of said circuit breaker under fault current conditions.

3. In a circuit breaker for instantaneous trip opening under fault current conditions, a movable contact arm, a movable contact, a complementary contact; said movable contact secured to said movable contact arm, said movable contact engaging said complementary contact at the circuit breaker closed position, said contacts being disengaged at the circuit breaker open position, fault current responsive means for opening said circuit breaker under fault current conditions, said fault current responsive means comprising thermal and magnetic means, said magnetic means comprising a hook-shaped armature and a magnet, said magnet being secured to said thermally responsive means, said armature being pivotally movable when attracted by said magnet under fault current conditions, a housing comprising a base and a cover, said circuit breaker being mounted on said base, said cover in combination with said base completely covering and protecting said circuit breaker, said hook-shaped armature and said thermal means moved in opposite directions to effect opening of said circuit breaker under fault current conditions.

4. In a multi-pole circuit breaker for instantaneous trip opening under fault current conditions, a plurality of movable contact arms, a plurality of movable contactst, a plurality of complementary contacts, a shaft securing said movable contact arms together for simultaneous movement, said movable contacts mounted on said movable contact arms, said movable contacts engaging said complementary contacts at the circuit breaker closed position, said contacts being disengaged at the circuit breaker open position, a toggle means connected to one of said movable contact arms, said toggle being collapsed in one direction at the circuit breaker closed position and in the opposite direction at the circuit breaker open position, a V-shaped cradle mounted for rotation around one of its ends at the phase of the multi-pole circuit breaker at which the said toggle is located, said toggle means being mounted on its other side on the apex of said V-shaped cradle, a T-shaped member and an insulating handle movable together around the end of the central leg of the said T-shaped member, biasing means mounted between said movable contact and said T-shaped member for biasing said toggle in its collapsed positions, latching means comprising a latch pivoted at its center and a substantially circular latching surface, a tripper bar rotatable around its axis and common to all three poles of the multi-pole circuit breaker, said latching surface being mounted on said tripper bar in correspondence to the said cradle, said tripper bar having a plurality of radial extensions, a plurality of thermally responsive and magnetic means for rotating said tripper bar and for operating said latching means to unlatch said cradle at fault currents and cause the simultaneous opening of all phases of the multi-pole circuit breaker, each of said magnetic means comprising a magnet and a movable armature, each of said magnets being mounted on one of said thermally responsive means, each of said armatures comprising a hook-shaped member pivoted at one end and each engaging one of said tripper bar extensions.

5. In a multi-pole circuit breaker for instantaneous trip opening under fault current conditions, a plurality of movable contact arms, a plurality of movable contacts, a plurality of complementary contacts, a shaft securing said movable contact arms together for simultaneous movement, said movable contacts mounted on said movable contact arms, said movable contacts engaging said complementary contacts at the circuit breaker closed position, said contacts being disengaged at the circuit breaker open position, a toggle means connected to one of said movable contact arms, said toggle being collapsed in one direction at the circuit breaker closed position and in the opposite direction at the circuit breaker open position, a V-shaped cradle mounted for rotation around one of its ends at the phase of the multi-pole circuit breaker at which the said toggle is located, said toggle means being mounted on its other side on the apex of said V-shaped cradle, a T-shaped member and an insulating handle movable together around the end of the central leg of the said T-shaped member, biasing means mounted between said movable contact and said T-shaped member for biasing said toggle in its collapsed positions, latching means comprising a latch pivoted at its center and a substantially circular latching surface, a tripper bar rotatable around its axis and common to all three poles of the multi-pole circuit breaker, said latching surface being mounted on said tripper bar in correspondence to the said cradle, said tripper bar having a plurality of radial extensions, a plurality of thermally responsive and magnetic means for rotating said tripper bar and for operating said latching means to unlatch said cradle at fault currents and cause the simultaneous opening of all phases of the multi-pole circuit breaker, each of said magnetic means comprising a magnet and a movable armature, each of said magnets being mounted on one of said thermally responsive means, each of said armatures comprising a hook-shaped member pivoted at one end and each engaging one of said tripper bar extensions, a housing comprising a base and a cover, said multi-pole circuit breaker being completely mounted on said base, said cover being in combination with said base, completely encircling and protecting said multi-pole circuit breaker.

6. In a circuit breaker for instantaneous trip opening under fault current conditions, a movable contact arm, a movable contact, a complementary contact, said movable contact mounted on said movable contact arm, said movable contact engaging said complementary contact at the circuit breaker closed position, said contacts being disengaged at the circuit breaker open position, toggle means connected to said movable contact arm, said toggle being collapsed in one direction at the circuit breaker closed position and in the opposite direction in the circuit breaker open position, a V-shaped cradle mounted for rotation around one of its ends, said toggle means being mounted at its other side on the apex of said V-shaped cradle, a T-shaped member and a handle movable around the end of the central leg of the said T-shaped member, spring means mounted between said movable contact and said T-shaped member for biasing said toggle in the collapsed positions, latching means comprising a latch pivoted at its center and a substantially circular latching surface; said latching surface comprising a thin strip of spring material formed with the grain in essentially C-shape, such latching surface forming an economical, easily mounted and smooth latching surface having a minimum of friction, a tripper bar rotatable around its axis, said latching surface being mounted on said tripper bar, said tripper bar also having radial extensions, thermally responsive and magnetic means for operating said latching means to unlatch said cradle at fault currents, said magnetic means comprising a magnet and a movable armature, said magnet being mounted on said thermally responsive means, said armature comprising a hook-shaped member pivoted at one end and engaging one of said tripper bar extensions.

7. In a multi-pole circuit breaker for instantaneous trip opening under fault current conditions, a plurality of movable contact arms, a plurality of movable contacts, a plurality of complementary contacts, a shaft securing said movable contact arms together for simultaneous movement, said movable contacts mounted on said movable contacts arms, said movable contacts engaging said complementary contacts at the circuit breaker closed position, said contacts being disengaged at the circuit breaker open position, a toggle means connected to one of said movable contact arms, said toggle being collapsed in one direction at the circuit breaker closed position and in the opposite direction at the circuit breaker open position, a V-shaped cradle mounted for rotation around one of its ends at the phase of the multi-pole circuit breaker at which the said toggle is located, said toggle means being mounted on its other side on the apex of said V-shaped cradle, a T-shaped member and an insulating handle movable together around the end of the central leg of the said T-shaped member, biasing means mounted between said movable contact and said T-shaped member for biasing said toggle in its collapsed positions, latching means comprising a latch pivoted at its center and a substantially circular latching surface; said latching surface comprising a thin strip of spring material formed with the grain in essentially C shape, such latching surface forming an economical, easily mounted and smooth latching surface having a minimum of friction, a tripper bar rotatable around its axis and common to all three poles of the multi-pole circuit breaker, said latching surface being mounted on said tripper bar in correspondence to the said cradle, said tripper bar having a plurality of radial extensions, a plurality of thermally responsive and magnetic means for rotating said tripper bar and for operating said latching means to unlatch said cradle at fault currents and cause the simultaneous opening of all phases of the multi-pole circuit breaker, each of said magnetic means comprising a magnet and a movable armature, each of said magnets being mounted on one of said thermally responsive means, each of said armatures comprising a hook-shaped member pivoted at one end and each engaging one of said tripper bar extensions.

8. In a circuit breaker for instantaneous trip opening under fault current conditions, a movable contact arm, a tripper bar, a movable contact, a complementary contact; said movable contact arm carrying said movable contact; said movable contact engaging said complementary contact at the circuit breaker closed position; said contact being disengaged at the circuit breaker open position; fault current responsive means for opening said circuit breaker under fault current conditions; said fault current responsive means comprising thermal and magnetic means; said magnetic means comprising a magnet and a hook-shaped armature; said hook-shaped armature being pivotally mounted to said circuit breaker for rotation about its end; said magnet attracting said armature during the occurrence of fault current conditions; said hook-shaped armature engaging said tripper bar; said hook-shaped armature producing rotation of said tripper bar when attracted by said magnet.

JOHN C. BRUMFIELD.

References Cited in the file of this patent

UNITED STATES PATENTS

| Number | Name | Date |
|---|---|---|
| 2,588,497 | Dorfman et al. | Mar. 11, 1952 |
| 2,590,663 | Walker | Mar. 25, 1952 |